United States Patent
Mueller et al.

(10) Patent No.: US 12,007,552 B2
(45) Date of Patent: Jun. 11, 2024

(54) FAIL SAFE BEAM SHUTTER DEVICES AND SYSTEMS

(71) Applicant: University of Rochester, Rochester, NY (US)

(72) Inventors: Astrid M. Mueller, Ontario, NY (US); Jeffery W. Lefler, Ontario, NY (US)

(73) Assignee: University of Rochester, Rochester, NY (US)

( * ) Notice: Subject to any disclaimer, the term of this patent is extended or adjusted under 35 U.S.C. 154(b) by 566 days.

(21) Appl. No.: 17/240,905

(22) Filed: Apr. 26, 2021

(65) Prior Publication Data

US 2021/0333446 A1  Oct. 28, 2021

Related U.S. Application Data

(60) Provisional application No. 63/015,478, filed on Apr. 24, 2020.

(51) Int. Cl.
*G02B 26/02* (2006.01)

(52) U.S. Cl.
CPC .................. *G02B 26/023* (2013.01)

(58) Field of Classification Search
CPC ........ G02B 26/023; G02B 5/00; G02B 5/003; G02B 5/22; G02B 26/00; G02B 26/02; H01S 3/005; H01S 3/0085; H01S 3/10; H01S 3/10038
USPC ....... 359/602, 601, 609, 611, 614, 227, 230, 359/234, 885, 889, 892, 903; 372/9, 109
See application file for complete search history.

(56) References Cited

U.S. PATENT DOCUMENTS

| | | | |
|---|---|---|---|
| 4,332,450 A | 6/1982 | Griffith |
| 4,415,231 A | 11/1983 | Kaczensky |
| 4,799,767 A | 1/1989 | Woodruff |
| 4,946,256 A | 8/1990 | Woodruff |
| 5,032,005 A | 7/1991 | Woodruff |
| 5,596,590 A | 1/1997 | de Ruyter |
| 6,710,337 B2 | 3/2004 | Engelhardt |
| 8,416,820 B1 | 4/2013 | Ward |
| 9,281,733 B2 | 3/2016 | Woodruff |
| 2019/0369385 A1 | 12/2019 | Stephenson |

FOREIGN PATENT DOCUMENTS

| | | |
|---|---|---|
| CN | 209470152 U | * 10/2019 |
| EP | 0899595 A2 | 3/1999 |

OTHER PUBLICATIONS

Unknown, Reference Notes, NM Laser Products, 2018 Retrieved Feb. 2020 from https://www.nmlaser.com/technical-information/laser-shutter-support.

* cited by examiner

*Primary Examiner* — Arnel C Lavarias
(74) *Attorney, Agent, or Firm* — Laurence J. Hyman; Hyman IP Law (57) ABSTRACT

The invention provides apparatuses and systems for cutting off electromagnetic radiation (ER) beams, such as laser beams. The apparatuses and systems employ gravitational force on a shutter to close off the path of the ER beam if power is cut to an electromagnet holding the shutter out of the beam path. Power to the electromagnet is typically connected to a safety interlock connected to a door or other entry point to an enclosure in which the ER beam is being used. Additionally, the invention provides add-on devices that allow the ER beam to be blocked to change lenses or targets.

20 Claims, 1 Drawing Sheet

FAIL SAFE BEAM SHUTTER DEVICES AND SYSTEMS

CROSS-REFERENCE TO RELATED APPLICATIONS

This application claims priority to and the benefit of U.S. Provisional Patent Application No. 63/015,478, filed Apr. 24, 2020, the contents of which are incorporated herein by reference in their entirety.

STATEMENT OF FEDERAL FUNDING

Not applicable.

PARTIES TO JOINT RESEARCH AGREEMENT

Not applicable.

BACKGROUND OF THE INVENTION

A variety of applications require the use of a directed beam of electromagnetic radiation, or "ER." In particular, lasers of different powers and wavelengths have become widely used for applications ranging from serving as a pointer in a presentation to cutting industrial parts. For regulatory purposes, lasers of different powers have been grouped into classes based on the potential for lasers of different powers to cause eye or bodily injury. The classes range from class I, which encompasses lasers of such low power that they cannot cause eye injury, to class IV, which encompasses lasers that can not only cause severe eye and skin injury by direct or scattered radiation, but can also cause fires by igniting combustible materials.

In the United States, the Food and Drug Administration ("FDA") regulations set forth at 37 C.F.R. §§ 1040.10-11 require that any laser that permits user access to emissions in excess of class I be housed in a protective housing, with safety interlocks on any section of the housing that can be removed during use to prevent human access to radiation above levels designated by the regulations. Class IIIb and IV lasers must have a key-actuated master control with a removable key, and must not be operable when the key is removed. Internationally, standards for laser classification are set forth in International Electrotechnical Commission ("IEC") 60825-1: Safety of laser products—Part 1: Equipment classification, and requirements, Edition 3.0 and 60601-2-22: Medical electrical equipment—Part 2-22: Particular requirements for basic safety and essential performance of surgical, cosmetic, therapeutic and diagnostic laser equipment, Edition. 3.1 60825-1:2014. IEC 60825-1:2014 states that its standard is applicable to the safety of laser products emitting laser radiation in the wavelength range of 180 nm to 1 mm, provides for the classification of lasers and laser products according to their degree of optical radiation hazard, and is intended to reduce the possibility of injury by minimizing unnecessary accessible radiation and improving control of laser radiation hazards by use of protective features.

Higher power lasers or other sources of high-power ER beams are usually isolated in a room or enclosed area. By regulation, standards, or both, entry to the protected area is guarded by a safety interlock. Opening of the door or other entry point into the protected area causes the interlock to activate a safety system, preventing individuals entering the protected area from accidental exposure to the ER beam. In some systems, the interlock de-energizes the source of the laser or other ER beam. This can, however, cause unwanted delay or other problems, as it takes time to repower the beam source after it has been de-energized. Thus, lasers or other sources of ER are typically designed to direct the ER beam along a beam path through a protective housing, which terminates in a side containing an aperture allowing the beam to exit the housing when the beam path is uninterrupted. The protective housing may contain a shutter, which can move between an open position, which allows the ER beam to traverse the housing and exit the aperture, and a closed position, which blocks the beam from exiting the aperture. The shutter is normally in the open position to allow the beam to exit the aperture, but rapidly moves to the closed position when the safety interlock is interrupted to block the beam from exiting the aperture.

A number of shutter mechanisms for ER beams exist in the art. Some are designed for use as safety shutters, while others are designed to provide interrupted beams for cutting industrial products. The shutters differ in characteristics depending on the particular use for which the shutter is intended, and the type and power of the ER beam with which they are to be used. Industrial lasers using an interrupted beam to cut industrial goods, for example, may need to withstand hundreds of thousands of rapid on-off cycles in normal use. Shutters for lasers intended for use in academic settings, in contrast, may need to cut off an ER beam only a few times a month to prevent students or other individuals who might enter a laboratory while an ER beam is in use from exposure to the beam. Such a shutter may have to endure only a few hundred cycles over its lifetime, but must be as fail-safe as possible.

It would be desirable to have additional options for providing simple, fail-safe shutters, systems, and apparatuses for avoiding accidental exposure to ER beams. Surprisingly, the present invention fulfills these and other needs.

BRIEF SUMMARY OF THE INVENTION

In a first group of embodiments, the invention provides electromagnetic radiation (ER) beam shutter apparatuses with shutter return on power down. The apparatuses comprise
(a) a protective housing opaque to the ER beam, having (i) a top, a bottom, sides having a top and a bottom, a width, a length, a first end, a second end, an exterior, and an interior of each of the top, bottom, and sides, (ii) a central lumen traversing the length of the housing from the first end to the second end and defining a beam path for an ER beam, and (iii) an exit aperture disposed along the beam path at the second end,
(b) an electromagnet disposed on the top of the housing, integrated into the top of the housing, or disposed on the interior of the top of the housing,
(c) a shutter pivotally or rotatably attached to the interior of the housing, the shutter having a first side facing the first end of the housing and a second side facing the second end, the shutter having a ferromagnetic material disposed on the second side of the shutter, the shutter further being able to pivot or rotate from the interior top of the housing to a closed position on the interior bottom of the housing, thereby blocking the beam path prior to the first exit aperture. In some embodiments, the apparatus further comprises a connection point for providing electric power to the electromagnet. In some embodiments, the electromagnet is disposed on the top of the housing. In some embodiments, the electromagnet is integrated into the top of the housing. In some embodiments, the beam shutter apparatus further comprises wiring for connecting the electromagnet to a power source. In some embodiments, the pivotable or rotatable attachment of the shutter to the housing is a hinge. In some embodiments, the pivotable or rotatable attachment of the shutter to the housing is a shaft. In some embodiments, the shaft is connected to a knob on the exterior of the housing. In some embodiments, the shaft is connected to a motor, solenoid, or other actuator. In some embodiments, the first side of the shutter has a convex shape. In some embodiments, the first side of the shutter has a flat shape. In some embodiments, the first side of the shutter is mirrored. In some embodiments, the shutter is made of metal. In some of these embodiments, the metal is polished. In some embodiments, the metal is ferromagnetic. In some embodiments, the shutter has ferromagnetic material disposed on the shutter and the rest of the shutter is made of a heat-resistant ceramic. In some embodiments, the second side of the shutter has cooling fins. In some embodiments, the second side of the shutter has conduits for a coolant. In some embodiments, the stop position is defined by stop pins or other projections extending from the interior bottom or the bottom of the sides of the housing. In some embodiments, the stop pins or other projections extending from the interior bottom or bottom of the sides of the housing are coated with, covered with, wrapped in, encased by, or otherwise protected by, an elastomeric or soft thermoelastomeric material. In some embodiments, the elastomeric or soft thermoelastomeric material is natural or synthetic rubber. In some embodiments, the connection point for providing electric power to the electromagnet is connected to a safety interlock system that cuts power off to the electromagnet when the safety interlock is activated. In some embodiments, the connection point for providing electric power to the electromagnet is connected to a control for cutting power to the electromagnet.

In another group of embodiments, the invention provides an electromagnetic radiation (ER) beam shutter apparatus with shutter closing on power down, comprising: (a) a protective housing opaque to said ER beam, having (i) a top, a bottom, sides having a top half and a bottom half, a width, a length, a first end, a second end, an exterior, and an interior of each of the top, bottom, and sides, (ii) a central lumen traversing said length of said housing from said first end to the second end and defining a beam path for an ER beam, and (iii) an exit aperture disposed along the beam path at said second end, (b) an electromagnetic shutter pivotally or rotatably attached to the interior of the housing, the shutter having a first side facing the first end of the housing and a second side facing the second end, the shutter being able to rotate from the interior top of the housing to a closed position on the interior bottom of the housing, thereby blocking the beam path prior to the first exit aperture, the electromagnetic shutter being capable of attachment to an external power source, and (c) a ferromagnetic material disposed on the top of the housing, integrated into said top of the housing, or disposed on the interior of the top of the housing. In some embodiments, the ferromagnetic material is disposed on the top of the housing. In some embodiments, the ferromagnetic material is integrated into the top of the housing. In some embodiments, the beam shutter apparatus further comprises wiring for connecting the electromagnetic shutter to a power source. In some embodiments, the pivotal or rotatable attachment of the shutter to the housing is a hinge. In some embodiments, the pivotal or rotatable attachment of the shutter to the housing is a shaft. In some embodiments, the shaft is connected to a rotatable knob on the exterior of the housing, allowing the shaft to be rotated by turning the knob. In some embodiments, the shaft is connected to a knob on said exterior of said housing. In some embodiments, the shaft is connected to a motor, solenoid, or other actuator. In some embodiments, the first side of the shutter has a convex shape. In some embodiments, the first side of the shutter has a flat shape. In some embodiments, the first side of the shutter is mirrored. In some embodiments, the shutter is made of metal. In some embodiments, the metal is polished. In some embodiments, the shutter is made of a heat-resistant ceramic. In some embodiments, the second side of said shutter has cooling fins. In some embodiments, the second side of the shutter has conduits for a coolant. In some embodiments, the stop position is defined by stop pins or other projections extending from the interior bottom of the housing or the bottom half of the sides of the housing. In some embodiments, the stop pins or other projections extending from said interior bottom of the housing or from the bottom half of the sides of the housing are coated with, covered with, wrapped in, encased by, or otherwise protected by, an elastomeric or soft thermoelastomeric material. In some embodiments, the elastomeric or soft thermoelastomeric material is natural or synthetic rubber.

In yet another group of embodiments, the invention provides systems for preventing accidental exposure to an electromagnetic radiation ("ER") beam in an enclosed space having at least one openable entry point. The systems comprise: (a) a source providing an ER beam, (b) a protective housing opaque to said ER beam, having (i) a top, a bottom, sides having a top half and a bottom half, a width, a length, a first end facing said ER beam source, a second end, an exterior, and an interior of each of the top, bottom, and sides, (ii) a central lumen traversing said length of said frame from said first end to said second end and defining a beam path for an ER beam, and (iii) an exit aperture disposed along the beam path at the second end, the housing having a position fitting over or attached to the ER beam source so as to prevent leakage of the ER beam from the position when the housing is fitted over or attached to the ER beam source, (c) a shutter pivotally or rotatably attached to the interior of the housing, the shutter having a first side facing the first end of said housing and a second side facing the second end, the shutter being able to rotate from the interior top of the housing to a position on the interior bottom of the housing, thereby blocking the beam path prior to the first exit aperture, (d) an electromagnet (1) disposed on the top of the housing, integrated into the top of the housing, disposed on the interior of the top of said housing, or (2) disposed on or integrated in the shutter, the electromagnet being connected to a power source, wherein the electromagnetic is positioned so as to hold the shutter to ferromagnetic material disposed on or integrated into the shutter when energized, when the electromagnet is in the positions recited in element (d)(1), or wherein the electromagnetic is positioned so as to hold the shutter to ferromagnetic material disposed on or integrated into the housing when energized, when the electromagnet is in the positions recited in element (d)(2), and, (e) an interlock system wherein opening of the entry point into the protected space, cuts the power to the power source of the electromagnet. In some embodiments, providing power to the electromagnet requires a key to be turned in a lock.

In a related group of embodiments, the invention provides systems for preventing accidental exposure to an electromagnetic radiation ("ER") beam in an enclosed space having at least one entry point, the systems comprising: (a) a source providing an ER beam, (b) a protective housing of material opaque to the ER beam and having (i) a top, a bottom, sides extending from said top to said bottom of said housing, a width, a length, a first end facing the ER beam source, a second end, an exterior, and an interior of each of the top, bottom, and sides, (ii) a central lumen traversing the length of said frame from the first end to the second end and defining a beam path for an ER beam, and (iii) an exit aperture disposed along the beam path at the second end, (c) a ferromagnetic material disposed in or on said top of the housing or in or on at least one side of the housing near said top, (d) a shutter pivotally or rotatably attached to the interior of the housing and having a free end distal to the pivotal or rotatable attachment to the housing, the shutter having an electromagnet disposed at or near the distal end of said shutter, wherein (1) the electromagnet is capable of exerting a magnetic force sufficient to hold the shutter to the ferromagnetic material in or on the top of the housing or in or on the at least one side of said housing near the top when the electromagnet is energized, and (2) the electromagnet has wiring permitting the electromagnet to be connected to a power source internal to or to the housing, the shutter having a first side facing the first end of the housing and a second side facing the second end, the shutter being able to rotate from a first position near the interior top of the housing in which the shutter does not block the ER beam to a second position on the interior bottom of said housing, in which second position, the shutter blocks the ER beam path prior to the first exit aperture, (e) an interlock system having a sensor at the entry point to the enclosure which detects opening of the entry point into the protected space, the sensor operably linked to a switch which cuts off the power to the power source of the electromagnet when the sensor detects the entry. In some embodiments, providing power to said electromagnet requires a key to be turned in a lock.

In still another group of embodiments, the invention provides devices for temporarily blocking an electromagnetic radiation ("ER") beam entering the devices from a first protective housing having an exit aperture from which the ER beam exits the first protective housing, the devices comprising: (a) a second protective housing opaque to said ER beam, the second protective housing having (i) a top, a bottom, sides, a width, a length, a first end having an first aperture, a second end having a second aperture, an exterior, and an interior of each of the top, bottom, and sides, wherein the first end of the second protective housing is configured to fit over, cover, or attach to the exit aperture from the first protective housing, (ii) a central lumen traversing the length of the second protective housing frame from the first aperture to the second aperture and defining a first beam path for the ER beam from the exit aperture of the first protective housing through the second protective housing to the second aperture of the second protective housing, (b) an electromagnet disposed on the top of the second protective housing, integrated into the top of the second protective housing, or disposed on the interior of the top of the second protective housing, the electromagnet having connection points for connection to a power source, (c) a shutter pivotally or rotatably attached to the interior of the second protective housing, the shutter having a first side facing the first end of the housing and a second side facing the second end, the shutter being able to rotate from a first position at the interior top of the housing to a second position on the interior bottom of the housing, thereby blocking the beam path prior to the exit aperture, wherein the shutter is either (1) made of ferromagnetic material, or (2) is made in part or in whole of a non-ferromagnetic material, but has ferromagnetic material disposed thereon or attached thereto sufficient to permit the electromagnet to hold the shutter in the first position when the electromagnet is energized, and, (d) a control operable by an operator for cutting power to the electromagnet. In some embodiments, the second position of the shutter diverts the ER beam to a second beam path. In some embodiments, the second beam path is at an angle of 40-50° from the first beam path. In some embodiments, the second position of the shutter diverts the ER beam at to a second beam path at an angle 45° from the first beam path. In some embodiments, the second beam path directs the ER beam into a beam trap. In some embodiments, the control operable by an operator is a wired or a wireless hand-held control. In some embodiments, moving the shutter from the second position to the first position requires a key to be turned in a lock.

In another group of embodiments, the invention provides devices for temporarily blocking an electromagnetic radiation ("ER") beam entering the devices from a first protective housing having an exit aperture from which the ER beam exits the first protective housing, the devices comprising: (a) a second protective housing opaque to the ER beam, the second protective housing having (i) a top, a bottom, sides, a width, a length, a first end having an first aperture, a second end having a second aperture, an exterior, and an interior of each of the top, bottom, and sides, wherein the first end of said second protective housing is configured to fit over, cover, or attach to the exit aperture from the first protective housing, (ii) a central lumen traversing the length of the second protective housing frame from the first aperture to the second aperture and defining a first beam path for the ER beam from the exit aperture of the first protective housing through the second protective housing to the second aperture of the second protective housing, (b) a ferromagnetic material disposed in or on said top of the second protective housing or in or on at least one side of the second protective housing near the top, (c) a shutter pivotally or rotatably attached to the interior of the second protective housing, the shutter having a distal end to the pivotally or rotatable attachment to the interior of the second protective housing, a first side facing the first end of the housing and a second side facing the second end, the shutter being able to rotate from a first position at the interior top of the housing to a second position on the interior bottom of the housing, thereby blocking the beam path prior to the exit aperture, the shutter having an electromagnet disposed at or near the distal end of the shutter, wherein (1) the electromagnet is capable of exerting a magnetic force sufficient to hold the shutter to the ferromagnetic material in or on the top of the housing or in or on the at least one side of the housing near the top when the electromagnet is energized, and (2) the electromagnet has wiring permitting the electromagnet to be connected to a power source internal to or exterior to the housing, and, (d) a control operable by an operator for cutting power to the electromagnet. In some embodiments, the second position of said shutter diverts the ER beam to a second beam path. In some embodiments, the second position of the shutter diverts the ER beam to a second beam path at an angle 40-50° from the first beam path. In some embodiments, the second position of the shutter diverts the ER beam to a second beam path at an angle 45° from the first beam path. In some embodiments, the second beam path directs said ER beam into a beam trap. In some embodiments, the control operable by an operator is a wired or a wireless hand-held control. In some embodiments, moving said shutter from the second position to the first position requires a key to be turned in a lock.

In another group of embodiments, the invention provides systems comprising a device of any of the groups of embodiments described above, wherein the device is connected to an interlock system protecting entry into a protected area containing the device, which interlock system cuts off power to the electromagnet when the interlock system detects entry into the protected area when power is flowing to said electromagnet.

BRIEF DESCRIPTION OF THE DRAWINGS

FIGS. 1A and 1B. FIG. 1A. FIG. 1A depicts an embodiment of a device which can connect two portions of protective housing around a radiation beam path to insert a beam shutter into the beam path. In FIG. 1A, the beam shutter is in the closed position. A radiation beam entering the left side of the device is blocked by the beam shutter and is diverted downward rather than traversing and exiting the device. FIG. 1B.

FIG. 2A-F. FIGS. 2A-F are a series of photographs of an embodiment of a device containing an exemplar beam shutter of the invention. FIG. 2C shows a top view of the device. Each of FIGS. 2A-C show an electromagnet on the top of the device. The electromagnet has wires extending therefrom that allow the electromagnet to be connected to a power source. A knob visible on the side of the housing is connected by a shaft to an internal shutter blade; rotating the knob rotates the beam shutter up to the electromagnet on the top of the device. FIGS. 2D-F are photographs taken through the lumen of the same device.

DETAILED DESCRIPTION

As set forth in the Background, accidental exposure of individuals to electromagnetic radiation ("ER") beams, such as laser beams, can cause them serious injury. This potential for injury has resulted in the development of regulatory standards and requirements, as well as a variety of beam shutter designs intended to prevent accidental exposures. Lasers, in particular, have a multiplicity of uses and a multiplicity of needed wavelengths and beam intensities to perform those uses.

The invention provides apparatuses and systems comprising new, gravity-fed, fail-safe beam shutters that reduce, and preferably prevent, accidental exposure to ER beams. In some embodiments, the ER beams are laser beams. For ease of reference, the discussion below will generally refer to the ER beam as a laser beam, with the understanding that the discussion will also pertain to other types of ER beams that can cause injury upon accidental exposure, unless otherwise specified or required by context.

Regulations and standards pertaining to lasers that have sufficient power or intensity to cause injury require that the laser be housed in a protective housing. The housing typically is tubular or a rectangular prism in shape, and has a diameter (if the housing is cylindrical) or width (if it is a rectangular prism), a length, a top, a bottom, sides, a central lumen defining the beam path the ER beam takes through the housing, an entry aperture, which provides an opening for the ER beam to enter into the central lumen, and a first exit aperture, through which the ER beam can exit towards its intended target. While it is convenient to make housings with a generally rectangular shape as rectangular prisms, which by definition have the same cross section along the length of the housing, the cross section of a housing that is generally rectangular in shape can widen or can narrow along its length, as desired by the manufacturer, with the dimensions of the sides adjusted accordingly.

It is expected that in most embodiments of the inventive beam shutters (the "first set of embodiments"), the beam shutter will be integrated into the protective housing and will be positioned between the beam source and the exit aperture. In some embodiments, however, the housing may be designed to allow a device holding the inventive beam shutter to be inserted into the housing between the entry aperture and the first exit aperture. In these embodiments, the device may be considered as extending the length of the protective housing around the beam path, and the device will generally be sized to mate to the diameter (in the case of cylindrical housings) or width (in the case of rectangular housings) of the housing into which it is to be inserted. For example, the protective housing may be comprised of a first section and a second section, which connect to each through mating ends. The two sections can be pulled apart to permit the device holding the beam shutter to be inserted therebetween, and ends of the respective sections pushed onto mating ends of the device to form a continuous protective housing that now contains a beam shutter. In a third set of embodiments, the inventive beam shutter is contained in an "add-on" device that can be attached or coupled to the housing at the first exit aperture, positioning the beam shutter in the add-on device between the first exit aperture and a second exit aperture in the add-on device (the "second exit aperture") through which the beam exits the device when the beam shutter is in the open position. This third set of embodiments can be subdivided into two groups. The first group of the add-on devices are designed to be part of a fail-safe shutter system, with the shutter mechanism connected to a safety interlock. The second group of the add-on devices allows the practitioner to block the ER beam with the shutter in the add-on device, so that the user can change lenses or filters positioned in the beam path before the add-on device without having to turn off the beam source. In these embodiments, the shutter can have a control that is also connected to a safety interlock system, but in some preferred embodiments, it is a separate control that is not connected to a safety interlocked system, and which may be hand-held. In embodiments in which the control for the add-on device is not connected to a safety interlock system, it is contemplated that there is a separate shutter system (for example, one integrated into the protective housing) which is connected to a safety interlock.

For convenience of reference, the term "device" will be used below to refer generally to any of these three types of embodiments unless otherwise specified or required by context.

The inventive beam shutters employ a "trap-door" design, in which a rigid shutter is, when in the open position, held against or near the top of the housing by electromagnetic force, and falls into the closed position both force of gravity if the electromagnetic force fails or stops for any reason. The shutter therefore provides a fail-safe closing in the event the safety interlock system is activated by, for example, the opening of a door into the protected area while the ER beam is in use.

In a first group of embodiments, the shutter is configured as a plate or slab, and can either have an even thickness throughout or may vary in thickness. In particular, the plate or slab may be configured to be thicker, and therefore heavier, at the bottom than at the top, thereby making the shutter bottom-heavy and facilitating the fall of the shutter into its closed position. In these embodiments, the electromagnet that holds the shutter in the open position by electromagnetic force while current is present is typically disposed in or on the top of the protective housing in a position where it can exert enough magnetic force on the plate or slab of the shutter to hold the shutter in the open position, while the shutter is made, in whole or in part, of a ferromagnetic material that is positioned so that the shutter will be held in the open position by the electromagnet when current is flowing to the electromagnet. In a second group of embodiments, the shutter may be configured with (a) a section that is a plate or slab, which blocks the beam path through the housing when the shutter is in the closed position, and (b) a flange at one or both sides of the shutter. The word "flange" is used here to mean an extension projecting perpendicularly from the edge of the plate or slab section of the shutter, which extension allows the shutter to be held in the open position by magnetic force disposed on the side of the housing at or near the top of the housing. In this second set of embodiments, an electromagnet (1) is disposed on one side of the housing at or near the top (if there is a flange on only one side of the shutter) or, (2) is disposed on both sides of the housing at or near the top (if there is a flange on both sides of the shutter). Once again, the electromagnet is, or electromagnets are, disposed in a position and strength such that they can can exert enough magnetic force on the flange or flanges to hold the shutter in the open position when current is flowing to the electromagnet(s).

Powers of electromagnets of given sizes and configurations are well known, and it is expected that the fabricator of a given device can readily determine the appropriate power of electromagnet to hold a shutter with a given amount of ferromagnetic material in the open position when current is flowing to the electromagnet.

The shutter is pivotally or rotatably attached at or near the top of the housing. For example, the shutter may be attached to a hinge at the top of the housing. In some embodiments, the shutter is instead attached to a shaft positioned at or proximal to the top of the housing. However it is attached, the shutter is able to pivot or to rotate, from a position in which it blocks the beam path (also referred to herein as the "closed position"), to a position in which it is out of the beam path (also referred to herein as the "open position"). The shutter can be returned from the closed position to the open position mechanically, for example, by a motor, solenoid or other actuator. If the shutter is attached to a shaft, the motor, solenoid, or other actuator may be connected to the shaft. In some embodiments, the shaft may be turned manually, for example, by a knob disposed on the outside of the housing and connected to the shaft to which the blade is attached. (An embodiment in which an exterior knob connected to a shaft is shown in FIG. 2.) If the shutter is on a hinge rather than a shaft, it may also returned to the open position manually or by a motor, solenoid or other actuator. In these embodiments, the shutter can be returned to the open position by conventional means known in the art. For example, a pin can project from the motor, solenoid or other actuator on the side of the shutter facing the beam source (the "beam side" of the shutter). The pin then raises the shutter towards the open position as the motor, solenoid or other actuator turns, and, once the shutter is held by activation of the electromagnet, the pin can retract to allow the shutter to fall back to the closed position when power to the electromagnet fails. In another set of embodiments, a hinged shutter can have a cord or line attached to the non-beam facing side at the end distal to the hinge and connected to a motor disposed either in the housing or externally which can pull the cable so as to return the shutter from its closed position to its open position. For example, the motor may itself be disposed at the top of the housing, or may pull the cord or line through a ring disposed at the top of the housing. Once the shutter is in the open position and the electromagnet energized, thereby holding the shutter in the open position, power to the motor is cut, allowing the shutter to fall freely if power to the electromagnet is cut or lost.

In manual embodiments, a slot in the side can be positioned in the housing from the bottom of the beam side of the shutter and continuing in an arc from the bottom up almost to the top of the housing, with the arc curving up from the bottom in the direction away from the beam source. An arm can positioned through the slot to move the shutter back towards the open position until the shutter is held in the open position by the electromagnet. The arm can then be partially or wholly retracted. In these embodiments, the slot in the housing is typically surrounded by material, such as an elastomer, which allows the arm to move the shutter, but which closely covers the gap in the slot as the arm is moved, thereby preventing users from exposure to electromagnetic radiation through the slot. Alternatively, a hinged shutter can have a cable or cord attached to the non-beam facing side at the end distal to the hinge, which cord or line passes through an opening in the top of the housing, thereby allowing the user to pull the cord or line so as to return the shutter from its closed position to its open position. Alternatively, the cord or line may pass through a ring at near or at the top of the housing and then exit an opening on a side of the housing, again allowing the user to pull the cord or line so as to return the shutter from its closed position to its open position. Once the shutter is in the open position and the electromagnet energized, thereby holding the shutter in the open position, the user can release holding the cord or line, allowing the shutter to fall freely if power to the electromagnet is cut or lost.

When the shutter is in the open position, it allows the ER beam to reach and exit from the first exit aperture, or first and second exit apertures, as appropriate. The beam shutter is held in the open position by force from an electromagnet. A loss of power causes loss of the magnetic force countering the gravitational force on the shutter blade, whereupon the gravitational force on the blade causes it to fall to its closed position and block the beam path.

Figure 1A:
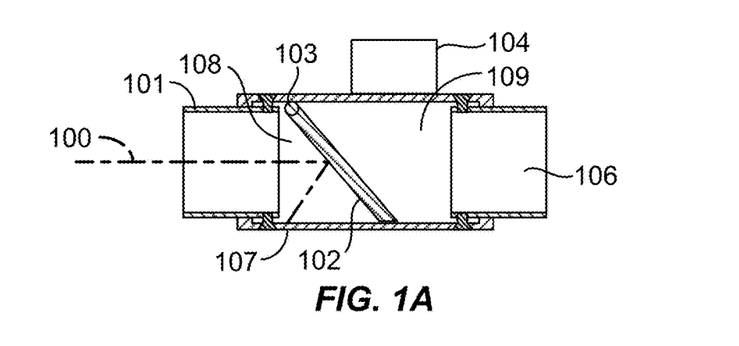
Figure 1B:
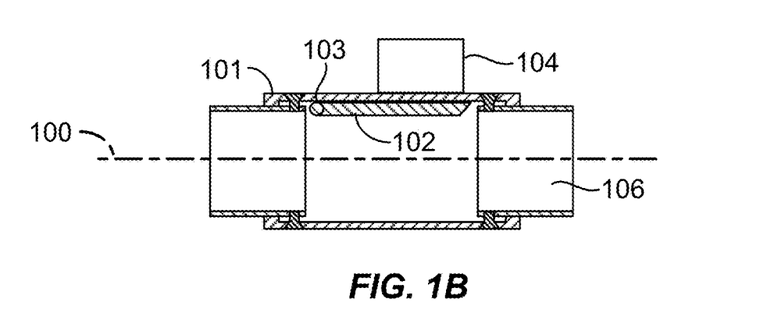
FIG. 1B shows the device of FIG. 1A with the beam shutter in the open position. A radiation beam is shown entering from the left side, traversing the device, and exiting through the exit aperture on the right side.

An embodiment of the inventive beam shutters is depicted in FIGS. 1A and 1B. FIG. 1A depicts a device that can be placed between sections of protective housing around an ER beam path or added at the exit aperture of the protective housing. The device is shown in the closed position. Referring to FIG. 1A, ER beam 100 enters device housing 101 from the left side. Shutter 102 has pivoted down on shaft 103, blocking central lumen 106, and blocking the path of beam 100, diverting the beam to position 107 on the bottom of device housing 101. Shutter 102 therefore divides the lumen of the device into a first section, 108, and a second section, 109. Shutter 102 confines ER beam 100 in section 108 and prevents ER beam 100 from exiting device housing 101.

FIG. 1B shows the device of FIG. 1A in the open position. Shutter 102 has been pivoted up by shaft 103 and is held against the top of device housing 101 by electromagnet 104. ER beam 100 enters device housing 101 from the left, traverses the device through central lumen 106, which defines a beam path, and exits device housing 101 to the right. Electromagnet 104 is shown distal to shaft 103 on which shutter 102 pivots, as that provides the most mechanical advantage and is a preferred embodiment. Electromagnet 104 can, however, be positioned closer to shaft 103 (or, in embodiments in which the shutter pivots on a hinge, the hinge), so long as the strength of electromagnet 104 while energized is sufficient to hold shutter 102 to device housing 101. FIG. 1C depicts a head-on view of the right-side of device housing 101, showing central lumen 106.

Figure 2A:
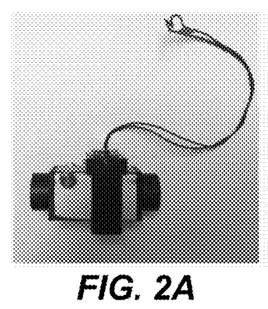
FIG. 2A shows an overall side view of the device.
Figure 2B:
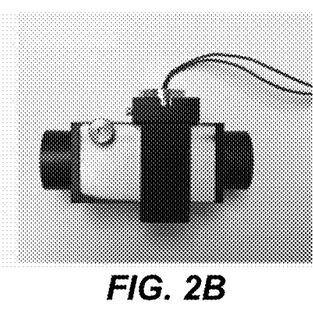
FIG. 2B shows a closer side view of the device.
Figure 2C:
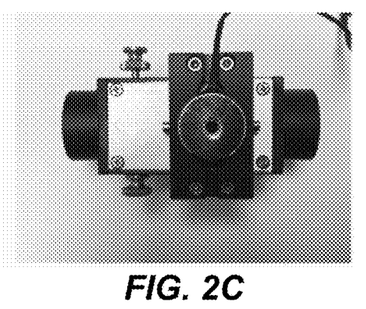
Figure 2D:
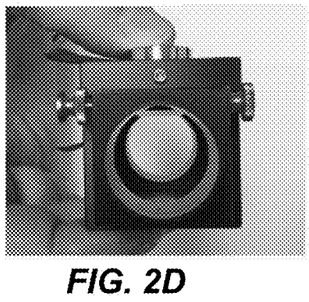
FIG. 2D shows the device with its lumen open. The beam shutter is being held to the top of the device, out of the beam path.
Figure 2E:
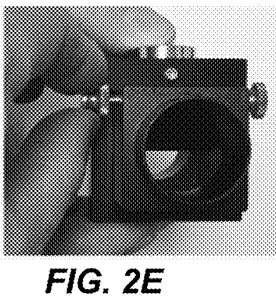
FIG. 2E shows the beam shutter lowered mid-way, partially blocking the lumen and the beam path it defines.
Figure 2F:
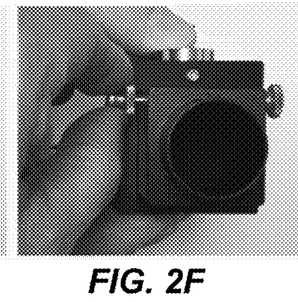
FIG. 2F shows the beam shutter in its fully lowered position, blocking the lumen.

FIGS. 2A-F present photographs of an exemplar embodiment of the invention in which the beam shutter is disposed in a device that can be interposed in the protective housing around an ER beam path. Wires extending from the device allow the electromagnet on the top of the device to be connected to an electric source. A knob on the outside of the device turns a shaft connected to the shutter, which is positioned inside the device, allowing the user to manually raise the shutter from the closed position to the open position. The shutter can then be held in the open position by the electromagnet when the electromagnet is receiving power. FIGS. 2A-C show side and top views of the device, respectively. FIG. 2D shows the device with the beam shutter in the open position, with the beam path open. In FIG. 2E, an external knob turning a shaft to which the beam shutter is attached has been manually turned to show the beam shutter lowered halfway, partially blocking the beam path. In FIG. 2F, the beam shutter has been fully lowered in the housing, fully blocking the beam path.

In embodiments such as the one depicted in FIGS. 1A and 1B, the electromagnet is disposed attached to the top of the housing. The shutter may be made wholly of ferromagnetic material, or may comprise a non-ferromagnetic material but have enough ferromagnetic material present for the shutter to be held in its open position by the electromagnet when current is flowing to the electromagnet. For example, the shutter may be made primarily of a ceramic material or of a non-ferromagnetic metal, but have a ferromagnetic material bonded, soldered, screwed into, or otherwise attached to the non-ferromagnetic material of the shutter on the side away from the beam source, or may have an insert of a ferromagnetic material in a portion of the shutter that will be the closest to the electromagnet. In some embodiments, the ferromagnetic material may be bonded or attached to the shutter on the side facing the beam source, but be close enough to the side facing away from the beam source so that the shutter will still be held by the electromagnet when the shutter is in its open position and current is flowing through the electromagnet.

In some embodiments, the electromagnet is integrated into the housing rather than sitting on top of it. For example, the housing may be manufactured with a cut out or receptacle area sized to accept a selected electromagnet, and the electromagnet then inserted into the cutout and secured to the housing. Depending on the size, thickness, and material comprising the housing, the electromagnet can, for example, be secured by a suitable adhesive, can be secured by screws attached to projections extending from the electromagnet, or can be soldered in place. In some embodiments, the electromagnet can be placed on the interior of the top of the housing, in which case it can be attached by methods such as those described in the preceding sentence. In embodiments in which the electromagnet is disposed on the interior of the housing, the electromagnet is preferably either shaped and sized to block stray radiation from leaking around its edges and escaping the housing, or has material disposed around it to prevent such leakage.

In an alternative set of embodiments, the shutter is an electromagnet, and is held to ferromagnetic material comprising or attached to the top of the protective housing. This configuration is most suitable for situations in which the shutter is expected to be subject to only occasional use, as the wires to the electromagnet in these embodiments have to be flexible enough to move easily with the shutter when there is a power loss and the electromagnet in the shutter releases from the ferromagnetic material on the housing.

Irrespective of whether the electromagnet is disposed on the top of the housing and the shutter is ferromagnetic, or whether the shutter is an electromagnet and the top of the housing is ferromagnetic, a loss of power to the electromagnet de-energizes it, stopping the magnetic force holding the shutter to the housing, whereupon gravity forces the shutter to swing down to its closed position. As the closing of the shutter occurs by gravity, it is fail safe.

In the embodiment shown in the photographs of FIG. 2, the shutter is raised manually to the open position. In other embodiments, the shutter is raised to the open position mechanically, typically by a motor, solenoid, or other actuator. The motor, solenoid, actuator, or other mechanism for mechanically raising the shutter is preferably controlled by a key lock, with persons having access to the key required to confirm visually that any persons present are clear of the area at which the beam is directed before turning the key to activate the shutter-raising mechanism. Such key lock systems are currently required by regulation or by standards for lasers or other beams of certain intensities. It is contemplated that the key lock systems currently in use can be used in embodiments of the inventive trap-door beam shutters.

Shutters for use in blocking ER beams are typically designed to have a closed position which diverts the beam at a 45 degree angle, as shown in FIG. 1A. In FIG. 1A, shutter 102 is stopped by hitting the bottom of device housing 101. In some embodiments, the travel of the shutter is instead stopped by pins ("stop pins") or other projections extending from the housing rather than by the bottom of the housing itself. In some embodiments, the stop pins or other projections extending from the housing, or at least the portion of the stop pins or projections that will be contacted by the shutter, are coated with, covered with, wrapped in, encased by, or otherwise protected by, a material that helps reduce vibration or shaking of the apparatus when the shutter hits the stop pin or other projection when it descends to the closed position. The material can be, for example, an elastomer or a soft thermoplastic elastomer. Suitable elastomers include natural rubber or synthetic rubbers.

Depending on the power of the beam which the shutter is designed to block, the shutter can absorb the energy of the beam itself or can divert the beam to an area, known as a "beam trap," which absorbs and dissipates the beam's energy. Depending on the power of the beam, for which the beam shutter apparatus is designed, the shutter blade or the beam trap, or both, may have cooling fins to dissipate heat or may have coolant flowing through channels or conduits to prevent the shutter, the beam trap, or both, from overheating. In some embodiments, particularly involving lower power beams, the shutter (sometimes referred to as the "blade")

may have a convex surface facing the incoming ER beam to spread the beam energy over a broader area over the interior of the protective housing, thereby dissipating the energy. In such embodiments, the convex portion of the shutter is preferably mirrored or reflective. In other embodiments, the shutter may be flat. In some embodiments, the shutter may be mirrored, while in others, it is a polished metal, such as stainless steel. The shutter is preferably made of a material, such as a ceramic or a metal, which can withstand any heat or energy it is expected to absorb from the ER beam while in the closed position. Shutters made of a material that is not itself ferromagnetic, such as ceramic, can be made sufficiently be Single layer foils are therefore not suitable as a material from which to construct the shutter.

In some embodiments, the shutter can have cooling fins disposed on the side of the shutter facing away from the ER beam. In embodiments in which the shutter is of ferromagnetic material and the electromagnet is disposed on the top of the housing, the cooling fins are preferably of ferromagnetic material to assist in holding the shutter to the electromagnet when the electromagnet is energized. Regardless of the material, the shutter is preferably rigid so that the edges of the shutter remain in a straight line when the shutter is in its closed position, which assists in keeping energy from the deflected ER beam from escaping beyond the position of the shutter. It is noted that, for some high power ER beams, air in the protective housing enclosing the beam path may be evacuated. Use of a shutter made of a rigid material is still preferred in such applications.

As persons of skill are aware, shutters made of various materials, in various designs, and beam traps of different materials, in some cases with cooling features, have been in use for decades. It is assumed that persons of skill are familiar with the various materials and designs of shutter devices and beam traps that have been used with ER beams of various classes and powers in the past.

In some embodiments, the invention further provides systems incorporating the apparatuses described above. As discussed in the Background, ER beams are often used in an enclosed space with features intended to protect individuals entering the enclosed space from injury. Entry points to the enclosed space, such as the door to a room in which the ER beam is being used, are typically protected by an interlock system. If an individual opens the door while the ER beam is on, the interlock is activated and cuts power to the ER beam or causes a beam shutter to close. Either blocks the ER beam from exiting the protective housing, thereby protecting the individual who entered the room from accidental contact by the ER beam.

The discussion above has primarily focused on embodiments and systems for use with, or part of, safety interlock systems. As noted earlier, however, in some embodiments, the "trap-door" shutters can be used in add-on devices that can be placed at the end of the protective housing around an ER beam to permit the user to block the ER beam when desired to allow lenses, filters, or other optics to be changed without having to first power down the ER beam source. For convenience of reference, these embodiments are sometimes referred to below as "when desired" beam shutter devices.

In "when desired" beam shutter devices, the add-on device is configured with a first end having a first aperture, a central section holding the beam shutter, and a second end having a second aperture, with a lumen through the device defining a beam path from said first aperture to said second aperture, which lumen is blocked by the beam shutter when it is in its closed position. The first end of the device is designed to fit over or to mate with the exit end or the exit aperture of the protective housing around the ER beam. The shutter and electromagnet or electromagnets are generally as described above. The difference is that, in the embodiments described above, power to the electromagnet holding the beam shutter while the ER beam is on is cut only when a safety interlock detects a breach of an entrance into the protected area. The "when desired" beam shutter devices, in contrast, have a switch which allows the user to cut power to the electromagnet when that is desired by the user. The power to the electromagnet in the "when desired" beam shutter devices can be (1) dual-controlled by both being connected to a safety interlock and to a control allowing power to the electromagnet cut off when desired, or (2) controlled by a control allowing power to the electromagnet cut off when desired. The control for cutting off power to the electromagnet when desired can be in a hand-held device.

For ER beam sources that are required by regulation, standards, or both, to have a beam shutter connected to a safety interlock system, a "when desired" beam shutter device of the second type should be used only when a beam shutter connected to a safety interlock system is present between the beam source and the "when desired beam shutter device. Finally, the ER beam is still on when the power to the electromagnet is cut by the "when desired" beam shutter device blocks the beam. As noted earlier, ER beams that have power or intensity that would cause injury to persons exposed to the beam are subject to regulatory requirements or standards which in some cases may require that an operator turn a key or other control before the ER beam can exit the protective housing. Accordingly, in embodiments in which the ER beam to be blocked by the inventive shutters falls within these or similar regulatory requirements or standards, returning the shutter to a position opening the beam path is preferably controlled by a key to be turned in a lock system, or such other control system as may be required by the applicable regulation or standard, which the operator is reminded to confirm visually that no one will be in the path of the beam before the shutter is returned to the open position.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. An electromagnetic radiation (ER) beam shutter apparatus with shutter return on power down, comprising:
   (a) a protective housing opaque to said ER beam, having
      (i) a top, a bottom, sides, a width, a length, a first end, a second end, an exterior, and an interior of each of said top, bottom, and sides,
      (ii) a central lumen traversing said length of said housing from said first end to said second end and defining a beam path for an ER beam, and
      (iii) an exit aperture disposed along said beam path at said second end,
   (b) a beam shutter pivotally or rotatably attached to said interior of said housing, said shutter having a first side facing said first end of said housing and a second side facing said second end, which beam shutter is able to pivot or rotate from said interior top of said housing to a position on said interior bottom of said housing, in which position on said interior bottom of said housing, said beam shutter blocks said beam path prior to said first exit aperture, and, (c) an electromagnet positioned (1) on said top of said housing, integrated into said top of said housing, or disposed on said interior of said top of said housing, or (2) on said beam shutter, wherein, when said electromagnet is positioned as recited in (c)(1), said beam shutter has ferromagnetic material disposed on or integrated into at least a portion of said beam shutter in a position such that said beam shutter can be held by electromagnetic force to said top of said housing when said electromagnet is energized, and when said electromagnet is positioned as recited in (c)(2), at least a portion of said housing has ferromagnetic material disposed on or integrated into said top of said housing in a position such that said beam shutter can be held by electromagnetic force to said top of said housing when said electromagnetic is energized.

2. The beam shutter apparatus of claim 1, wherein said pivotable or rotatable attachment of said shutter to said housing is a hinge or a shaft.

3. The beam shutter apparatus of claim 2, wherein said shaft is connected to a knob on said exterior of said housing, or connected to a motor, solenoid, or other actuator.

4. The beam shutter apparatus of claim 1, wherein said first side of said shutter is mirrored.

5. The beam shutter apparatus of claim 1, wherein said electromagnet is disposed on or integrated into said top of said housing and said beam shutter has disposed thereon, integrated into, or made or, ferromagnetic material positioned so as to be able to hold said beam shutter to said top of said housing when said electromagnet is energized.

6. The beam shutter apparatus of claim 5, wherein said shutter is of ferromagnetic material.

7. The beam shutter apparatus of claim 1, wherein said electromagnet is disposed on or integrated into said beam shutter and said top of said housing has disposed thereon, integrated into, or made of, ferromagnetic material positioned so as to be able to hold said beam shutter to said top of said housing when said electromagnet is energized.

8. The beam shutter apparatus of claim 1, further wherein said position on said interior bottom of said housing to which said beam shutter is able to pivot or rotate is defined by stop pins or other projections extending from said interior bottom of said housing or said bottom half of said sides.

9. The beam shutter apparatus of claim 1, wherein said electromagnet has a source of electric power and said source of electric power is connected to a safety interlock system that cuts power off to said electromagnet when said safety interlock is activated.

10. A system for preventing accidental exposure to an electromagnetic radiation ("ER") beam in an enclosed space having at least one openable entry point, said system comprising:

(a) a source providing an ER beam, (b) a protective housing opaque to said ER beam, having
  (i) a top, a bottom, sides, a width, a length, a first end facing said ER beam source, a second end, an exterior, and an interior of each of said top, bottom, and sides,
  (ii) a central lumen traversing said length of said frame from said first end to said second end and defining a beam path for an ER beam, and
  (iii) an exit aperture disposed along said beam path at said second end, said housing having a position fitting over or attached to said ER beam source so as to prevent leakage of said ER beam from said position when said housing is fitted over or attached to said ER beam source, (c) a beam shutter pivotally or rotatably attached to said interior of said housing, said beam shutter having a first side facing said first end of said housing and a second side facing said second end, said beam shutter being able to rotate from said interior top of said housing to a closed position on said interior bottom of said housing, thereby blocking said beam path prior to said first exit aperture, (d) an electromagnet positioned (1) on said top of said housing, integrated into said top of said housing, or disposed on said interior of said top of said housing, or (2) on said beam shutter, wherein, when said electromagnet is positioned as recited in (d)(1), said beam shutter has ferromagnetic material disposed on or integrated into at least a portion of said beam shutter in a position such that said beam shutter can be held by electromagnetic force to said top of said housing when said electromagnet is energized, and, when said electromagnet is positioned as recited in (d)(2), at least a portion of said housing has ferromagnetic material disposed on or integrated into said top of said housing in a position such that said beam shutter can be held by electromagnetic force to said top of said housing when said electromagnetic is energized, said electromagnet being connected to a power source, and (e) an interlock system wherein opening of said entry point into said protected space stops power from reaching said electromagnet.

11. The system of claim 10, wherein restoring power to said electromagnet once said interlock stops power from reaching said electromagnet requires a key to be turned in a lock.

12. The system of claim 10, wherein said interlock has a sensor at said entry point to said enclosure which detects opening of said entry point into said protected space, said sensor operably linked to a switch which cuts off said power to said electromagnet when said sensor detects said entry.

13. A device for temporarily blocking an electromagnetic radiation ("ER") beam entering said device from a first protective housing having an exit aperture from which said ER beam exits said first protective housing, said device comprising:

(a) a second protective housing opaque to said ER beam, said second protective housing having
  (i) a top, a bottom, sides, a width, a length, a first end having an first aperture, a second end having a second aperture, an exterior, and an interior of each of said top, bottom, and sides, wherein said first end of said second protective housing is configured to fit over, cover, or attach to said exit aperture from said first protective housing, and,
  (ii) a central lumen traversing said length of said second protective housing frame from said first aperture to said second aperture and defining a first beam path for said ER beam from said exit aperture of said first protective housing through said second protective housing to said second aperture of said second protective housing, (b) a beam shutter pivotally or rotatably attached to said interior of said second protective housing, said beam shutter having a first side facing said first end of said housing and a second side facing said second end, said beam shutter being able to rotate from a first position at said interior top of said housing to a second position on said interior bottom of said housing, thereby blocking said beam path prior to said exit aperture, (c) an electromagnet positioned (1) on said top of said housing, integrated into said top of said housing, or disposed on said interior of said top of said housing, or (2) on said beam shutter, wherein, when said electromagnet is positioned as recited in (d)(1), said beam shutter has ferromagnetic material disposed on or integrated into at least a portion of said beam shutter in a position such that said beam shutter can be held by electromagnetic force to said top of said housing when said electromagnet is energized, and, when said electromagnet is positioned as recited in (d)(2), at least a portion of said housing has ferromagnetic material disposed on or integrated into said top of said housing in a position such that said beam shutter can be held by electromagnetic force to said top of said housing when said electromagnetic is energized, said electromagnet being connected to a power source, said electromagnet having a source of power that can energize said electromagnet, and, (d) a control operable by an operator for cutting power to said electromagnet.

14. The device of claim 13, wherein said electromagnet is positioned on or integrated into said top of said housing and said beam shutter is made of ferromagnetic material or has ferromagnetic disposed on or integrated into said beam shutter, said ferromagnetic material being positioned to allow said electromagnet to hold said beam shutter to said top of said second protective housing when said electromagnet is energized.

15. The device of claim 13, wherein said electromagnet is positioned on or integrated into said beam shutter and said top of said second protective housing is made of ferromagnetic material or has ferromagnetic disposed on or integrated into said top of said second protective housing, said ferromagnetic material being positioned to allow said electromagnet to hold said beam shutter to said top of said second protective housing when said electromagnet is energized.

16. The device of claim 13, wherein said second position of said shutter diverts said ER beam to a second beam path at an angle 40-50° from said first beam path.

17. The device of claim 13, wherein said second beam path directs said ER beam into a beam trap.

18. The device of claim 13, wherein said control operable by an operator is a wired or a wireless hand-held control.

19. The device of claim 13, further wherein moving said shutter from said second position to said first position requires a key to be turned in a lock.

20. The beam shutter apparatus of claim 8, wherein a portion of said stop pins or other projections extending from said interior bottom of said housing or said bottom half of said sides to which said beam shutter is able to pivot or rotate which comes into contact with said beam shutter when said beam shutter pivots or rotates to said interior bottom or said bottom half of said sides is coated with, covered with, wrapped in, encased by, or otherwise protected by, an elastomeric or soft thermoelastomeric material.

* * * * *